– 
United States Patent Office 2,751,378
Patented June 19, 1956

2,751,378
BENZYLPENICILLIN THIO ACID

David A. Johnson, Fayetteville, N. Y., and John C. Sheehan, Arlington, Mass., assignors to Bristol Laboratories Inc., Syracuse, N. Y., a corporation of New York No Drawing. Application March 11, 1953,
Serial No. 341,816

1 Claim. (Cl. 260—239.1)

This invention relates to penicillin thioanhydrides and to penicillin thioacids and their salts as well as to processes for the preparation of these compounds.

The compounds of the present invention are useful as antibacterial agents and as intermediates for synthesis of new salts of the new thiopenicillins, which exhibit antibacterial action and are also useful as growth-stimulating supplements in animal and poultry feeds and for use to stimulate the growth of plants, such as radishes, oats and grass.

There are now discovered, according to the present invention, thiobenzylpenicillin, substituted ammonium salts of thiobenzylpenicillin, and the process of reacting a mixed anhydride of benbzylpenicillin and a mono-ester of carbonic acid with hydrogen sulfide to produce thiobenzylpenicillin.

The preparation of the mixed anhydrides used as reagents is described in the co-pending application of my colleague John C. Sheehan, Serial Number 341,828, filed March 11, 1953, in detail and an example is given below. The reaction of these mixed anhydrides with hydrogen sulfide is discussed in the following paragraphs.

The reaction is preferably performed in an inert solvent, whose choice depends primarly upon the solubility of the chosen reagents therein and upon convenience and low cost. Suitable inert solvents thus include chlorinated hydrocarbons such as methylene chloride, chloroform and chlorobenzene; aliphatic ketones such as acetons; aliphatic esters such as ethyl acetate and amyl acetate; and aliphatic amides such as dimethylacetamide and dimethylformamide. Methylene chloride, dimethylformamide and dimethylacetamide are preferred.

The reaction may be carried out at room temperature or, preferably, at a lower temperature such as 0° C. and requires approximately five to thirty minutes to go to completion at 0° C. Additional time is required at lower temperatures. The mixed anhydride used may have been isolated but is preferably prepared and used in situ to react with the hydrogen sulfide.

Reactions bearing a formal resemblance to some of those of the present invention have been used previously only on simpler acids and have never been applied to a complicated beta-lactamthiazolidine compound; see Wieland et al., Annalen 569, 122; 572, 190; 573, 99; Boissonnas, Helv. Chim. Acta 34, 874; Schwyzer, Helv. Chim. Acta 35 (6), 1903; and Cronyn and Jin as well as Sheehan and Johnson, J. Amer. Chem. Soc., 74, 4726. Ethyl chloro-ortho-carbonate is the equivalent of ethyl chlorocarbonate in the process of the present invention.

While the present invention has been described with particular reference to mixed anhydrides of penicillin G, it will be understood that the mixed anhydrides of other penicillins are also included within the scope of this invention. For instance, penicillins such as the penicillins G, F, X, O, K, dihydro F and mixtures of two or more such penicillins, particularly such mixtures containing at least 85% of penicillin G, are included within the scope of this invention.

It will be understood that, without departing from the spirit of the invention or the scope of the claims, various modifications may be made in the specific expedients described as these are illustrative only.

EXAMPLE I

*Mixed anhydride of benzylpenicillin and ethoxyformic acid*

Triethylamine benzylpenicillin (4.36 g., 0.01 mole) in 50 ml. methylene chloride is treated at 0° C. with ethyl chloroformate (0.96 ml., 0.01 mole). After thirty minutes, the solution is washed with two 25 ml. portions of cold one molar phosphate buffer of pH 7.3 and twice with cold water (25 ml.), dried over magnesium sulfate and concentrated under reduced pressure at 0° C. to leave an oil. Traces of solvent are removed from this oil at 0° C. and one to two mm. pressure for 90 minutes to leave the product, the mixed anhydride of benzylpenicillin and ethoxyformic acid as a colorless gum, 4.0 g., 98.5% of theoretical yield, as sample #1.

*Analysis.*—Calc'd for $C_{19}H_{22}N_2O_6S$: C, 56.14; H, 5.46. Found: C, 55.4; H, 5.44.

*Analysis.*—Calc'd for $C_{32}H_{34}O_7N_4S_2$ (the symmetrical anhydride): C, 59.1; H, 5.27.

The above procedure is duplicated to give sample #2 of this product, 4.0 g., 98.5% yield, as a colorless glass at 0° C. which becomes a gum at room temperature.

*Analysis.*—Calc'd for $C_{19}H_{22}N_2O_6S$: C, 56.14; H, 5.46. Found: C, 55.4; H, 5.35.

Sample #1 of the product is found to be soluble in benzene, acetone, ethyl acetate, methanol, ethanol, methylene chloride and ether and to be insoluble in water and the Skellysolves.

After storage for 48 hours at 5° C., sample #1 (100 mgms.) is dissolved in 10 ml. acetone and diluted to 100 ml. with one molar potassium phosphate buffer of pH 7.3. After standing for five hours, this solution assays 892 and 974 units/ml. in the standard penicillin assay for an average of 933 (theoretical potency is 1460). These results are taken to indicate 64% hydrolysis of the anhydride to penicillin and to support the structure of the mixed anhydride by showing that the penicillin moiety has not been altered.

The preparation of the mixed anhydride as above is repeated without allowing the product to stand for 48 hours. 100 mgms. of the product is dissolved in 10 ml. acetone and added to 75 ml. one molar potassium phosphate buffer of pH 7.3. This mixture is diluted to 100 ml. with water, allowed to stand four hours and then found to assay 1128 and 1217 units/mgm. (average: 1172 u./mgm.).

Sample #2 of the product, after 24 hours storage at 5° C., is dissolved in 100 ml. ethyl acetate. Fifty ml. of this solution is treated with 0.50 ml. (0.005 mole) n-butylamine, allowed to stand for three hours, washed with buffer and water, dried over magnesium sulfate and concentrated to a small volume. The addition of Skellysolve B precipitates 1.22 g. (63% yield) of benzylpenicillin N-N-butylamide, M. P. 134–135° C. uncorrected, which shows no depression of melting point when admixed with a sample of benzylpenicillin N-n-butylamide prepared by another method.

EXAMPLE II

*Thiobenzylpenicillin*

Triethylammonium benzylpenicillin (8.70 g., 0.02 mole) dissolved in 100 ml. methylene chloride is reacted for one hour at room temperature with ethyl chlorocarbonate (1.9 ml., 0.02 mole). The solution is then saturated with hydrogen sulfide, stored at room temperature for eighteen hours, and washed successively with 100 ml. one molar phosphate buffer of pH 7.4 and with saturated aqueous sodium bicarbonate. Separation and acidification of the sodium bicarbonate layer with concentrated phosphoric acid gives 1.40 g. of thiobenzylpenicillin as a colorless precipitate which is collected by filtration. This product is suspended in 100 ml. water, dissolved by addition of the minimum amount of sodium bicarbonate, acidified to the cloud point with acetic acid and reacted with 1.26 g. 1,1-diphenyl-3-(N-piperidyl)-propane hydrochloride dissolved in 25 ml. water. There is immediately precipitated 2.10 g. of pale tan, solid 1,1-diphenyl-3-(N-piperidyl)-propane salt of thiobenzylpenicillin.

EXAMPLE III

Thiobenzylpenicillin

Triethylammonium benzylpenicillin (4.36 g., 0.01 mole) in 100 ml. methylene chloride is reacted for thirty minutes at 0° C. with ethyl chlorocarbonate (0.96 ml., 0.01 mole), hydrogen sulfide is then passed in slowly for fifteen minutes and the solution is stored at room temperature for five hours. The solution is then washed with 50 ml. water and extracted with 100 ml. saturated aqueous sodium bicarbonate. The sodium bicarbonate layer is separated, cooled in an ice-bath and acidified with concentrated hydrochloric acid. A colorless precipitate of thiobenzylpenicillin (1.40 g.) separates, is collected by filtration, washed well with water, dried in a vacuum desiccator and found to melt at about 75°–90° C. with decomposition.

The thiobenzylpenicillin is sufficiently strong an acid to form salts with metals, as illustrated by sodium in an example above, and to form salts with ammonia and substituted ammonia, i. e. primary, secondary and tertiary amines. Many of the latter are highly insoluble in water, as illustrated for the salt of 1,1-diphenyl-3-(N-piperidyl)propane. Such an insoluble salt is also highly useful for the isolation and purification of thiobenzylpenicillin.

It is recognized that the free acid form and ionic salts of thiobenzylpenicillin are best represented as

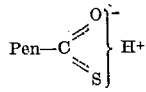

to indicate that the hydrogen ion (or other corresponding cation) is not fixed to either oxygen or sulfur and that both structures

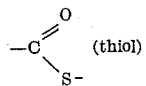 (thiol)

and

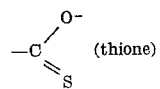 (thione)

or intermediate forms are present. For this reason, the products of the present invention are described by the use of the term "thio."

We claim:

Benzylpenicillin thioacid having the formula

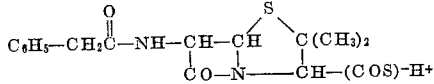

References Cited in the file of this patent

UNITED STATES PATENTS 2,577,699    Cooper _____ Dec. 4, 1951

OTHER REFERENCES

Cooper et al.: "JACS," vol. 70 (1948), pp. 3966–67.
Holyz et al.: "JACS," vol. 72 (1950), pp. 4760–63.
Cronyn: "JACS," vol. 74, September 1952, p. 4726.
Heyden Report CMR–H–14, Oct. 31, 1945, p. 4.